No. 835,837. PATENTED NOV. 13, 1906.
J. H. SEMMONS.
FAUCET.
APPLICATION FILED NOV. 23, 1905.

Witnesses
G. Manning.
Adele Torrens.

Inventor
John H. Semmons
By Delbert H. Decker
Attorney

UNITED STATES PATENT OFFICE.

JOHN H. SEMMONS, OF SHAMOKIN, PENNSYLVANIA.

FAUCET.

No. 835,837.  Specification of Letters Patent.  Patented Nov. 13, 1906.

Application filed November 23, 1905. Serial No. 288,709.

*To all whom it may concern:*

Be it known that I, JOHN H. SEMMONS, a citizen of the United States, residing at Shamokin, in the county of Northumberland and State of Pennsylvania, have invented a new and useful Improvement in Faucets, of which the following is a specification.

This invention relates to bib-cocks or faucets, and particularly to those having reciprocating valves.

The principal objects of this invention are the improvement of this style of faucet with respect to the ease and readiness of manipulation, the obliteration of the usual projecting operating handle or lever and the absolute prevention of hammering or chattering.

To this end the invention consists in the construction and combination of parts, as hereinafter described and claimed.

Figure 1:
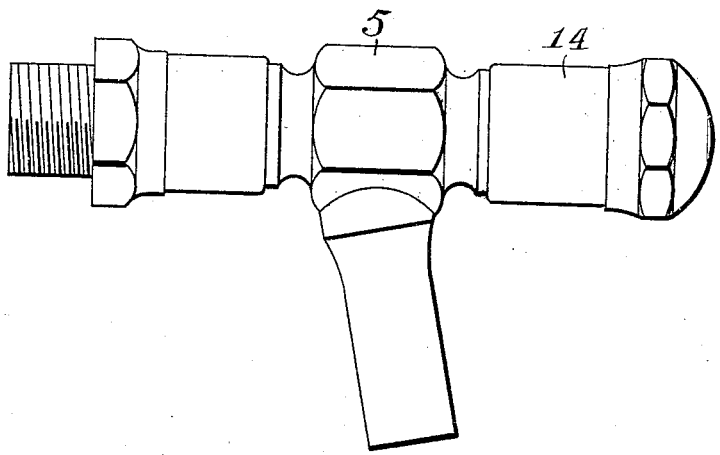
Figure 2:
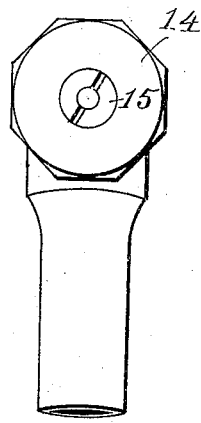
Figure 3:
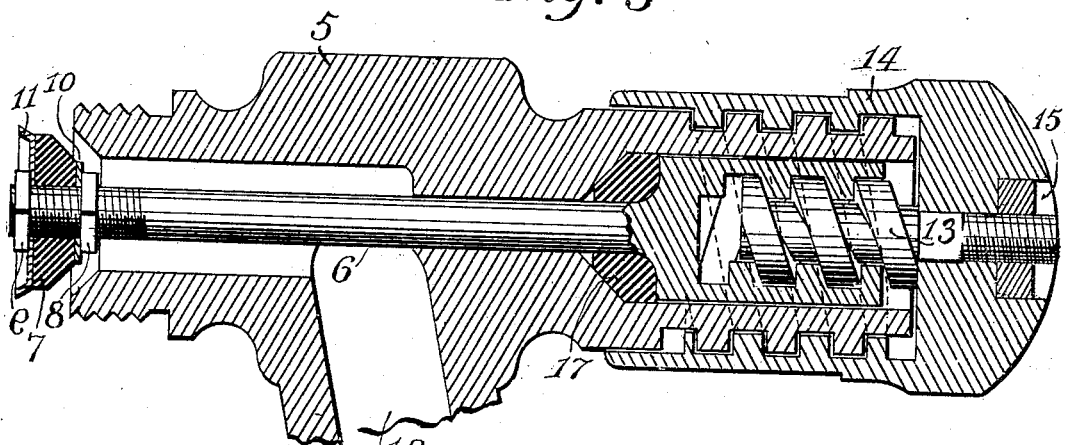
Figure 4:
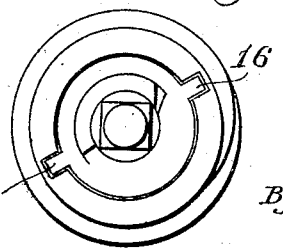

The sheet of drawings accompanying this specification forms a part thereof and illustrates in Figures 1 and 2, respectively, side and end elevations of the improved faucet, in Fig. 3 a longitudinal vertical axial section of the barrel of the faucet removed from the socket and disclosing the reciprocating valve and operating parts thereof, and in Fig. 4 an end elevation of the barrel of the faucet, the turning-cap having been removed.

The barrel of the faucet is indicated by 5. This is axially bored to receive the stem 6 of the reciprocating valve. The valve consists, preferably, of the rubber washer 7, adjustably mounted upon the rod 6 by means of the nuts 8 and 9, between which and the rubber washer are the disk washer 10 and the cup-washer 11. The seat for the valve is formed in the usual way by a countersink at the entrance of the ingress-port, the egress-port being represented at 12. The forward end of the valve-stem is enlarged, recessed, and the recess provided with a screw-thread for the reception of the screw 13, which screw is secured in the turning-cap 14 by means of nut 15 upon the shank thereof, which nut is seated in a countersink in said cap. The turning-cap is screw-threaded upon the forward end of the barrel of the faucet and its screw-thread is cut in the reverse direction to that of the thread upon screw 13. The valve-stem may be prevented from rotating by any suitable means, preferably by one or more feathers 16 formed thereon and resting in grooves in the barrel 5. A seal for the valve-stem is formed by means of the rubber collar 17 mounted thereon in the forward recess of the barrel. In the valve thus formed it will be noted that a long and perfect guide is provided for the valve-stem, which absolutely insures the accurate seating of the valve, thereby preventing the chattering or hammering incident to uneven seating of valves now used.

While either one of the screw connections above described for the reciprocation of the valve would be sufficient, yet the two as associated constitute the preferred construction, since thereby the movement of the turning-cap necessary for the opening or closing of the faucet is greatly reduced, thus rendering it more rapid and easy.

The turning-cap 14 needs no further projections than those shown to provide a sufficiently firm hold thereof for operating the valve; but obviously any projections or other means for giving a firmer hold upon it may be provided without affecting the invention herein disclosed, and other changes in form and relation of parts may be made without departing from the spirit of this invention.

The invention claimed is—

A faucet consisting of a barrel having a lateral port and an axial bore, a reciprocating non-rotating stem guided in said bore and having a screw-threaded socket at one end and a valve at the other for closing the passage to said port, a packing about said stem at the opposite side of said port, a cap screw-threaded upon the outer end of the barrel, and a screw having a reverse thread to that of the barrel secured to the cap and fitted to turn in the socket of the stem substantially as and for the purpose set forth.

In testimony whereof I have signed my name to this specification in the presence of two subscribing witnesses.

JOHN H. SEMMONS.

Witnesses:
 FRED. B. MOSER,
 CHARLES C. LARK.